June 15, 1943.  E. J. BILLSTROM ET AL  2,321,644
GLUE CLAMP CARRIER
Filed March 26, 1942  3 Sheets-Sheet 1

Inventors:
Edwin J. Billstrom
& Andrew H. Redin
By McCanna, Wintercorn
& Morsbach Attys.

June 15, 1943.   E. J. BILLSTROM ET AL   2,321,644
GLUE CLAMP CARRIER
Filed March 26, 1942   3 Sheets-Sheet 2

Inventors:
Edwin J. Billstrom
& Andrew H. Redin

By McCanna, Wintercorn & Morsbach
Attys.

June 15, 1943.　　E. J. BILLSTROM ET AL　　2,321,644
GLUE CLAMP CARRIER
Filed March 26, 1942　　3 Sheets-Sheet 3

Inventors:
Edwin J. Billstrom
Andrew H. Redin
By McCanna, Wintercorn & Morsbach
Attys.

Patented June 15, 1943

2,321,644

UNITED STATES PATENT OFFICE 2,321,644

GLUE CLAMP CARRIER

Edwin J. Billstrom and Andrew W. Redin, Rockford, Ill., assignors to Nels J. Billstrom, Inc., Rockford, Ill., a corporation of Illinois Application March 26, 1942, Serial No. 436,288

33 Claims. (Cl. 144—289)

This application is a continuation in part of our application Serial No. 380,918, filed February 27, 1941.

In these machines an endless carrier supports a series of clamping devices, each adapted for clamping together a number of boards or the like to be glued together, the carrier being advanced intermittently at the will of the operator so that one set of clamps at a loading or unloading station is moved out of the way and the next set of clamps is moved into position, the complete cycle of the carrier being of sufficient duration to permit the glued joints to set before the work is removed from a set of clamps and other freshly glued work is placed therein. These machines used to have a belt drive and suitable mechanism was employed to stop the carrier automatically when the advancing set of clamps had assumed the desired nearly horizontal position resting on a support in front of the operator. In recent years, however, these machines have been motor driven and the operator has had to control the motor by push buttons, with the result that it required close attention on the part of the operator and a good sense of timing to get the clamps resting properly on the support at each indexing of the machine.

It is the principal object of our invention to provide what may be called an automatic hand so that the operator merely starts the indexing movement by a pull on a handle at the front of the machine and the indexing movement commences and goes to completion without any further attention on the part of the operator.

We have proposed in the indexing of the machine to have it advance a little farther than necessary and then by reversal of the drive motor to bring the clamps to rest on the support that is swingable out of the way to permit the initial indexing movement. A difficulty is presented in this operation by the fact that the overrun of the motor after the circuit is broken is quite apt to cause the clamps to be forced down so firmly in contact with the support that they cannot be adjusted readily, if at all, to suit the kinds of work to be clamped. It is, therefore, another object of our invention to provide either or both of the following:

(1) A compensating adjustment for the auxiliary reverse switch so that the switch can be advanced angularly with respect to its operating cam enough to allow for the overrun of the motor and thus prevent jamming of the clamps against the support, or (2) Electromagnetic brake means operatively associated with the drive motor, normally spring pressed toward operative position but having solenoid means connected in circuit with the switch mechanism controlling the operation of the motor, whereby to automatically release the brakes whenever the circuit is completed through the motor but set the brakes to reduce to a minimum the overrun of the motor when the circuit is broken and accordingly avoid the jamming of the clamps on the support.

The invention is illustrated in the accompanying drawings, in which—

Similar reference numerals are applied to corresponding parts throughout the views.

Figure 1:
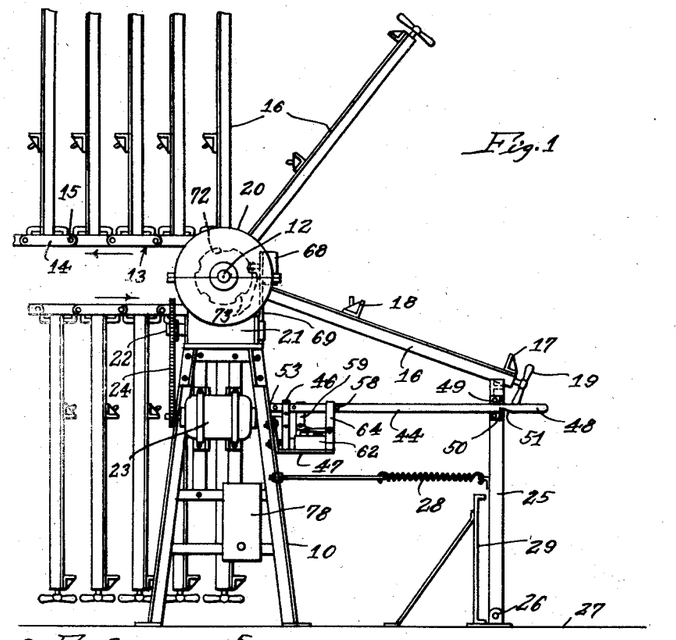
Figure 1 is a side view of one end portion of a glue clamp carrier embodying our invention.
Figures 2, 9:
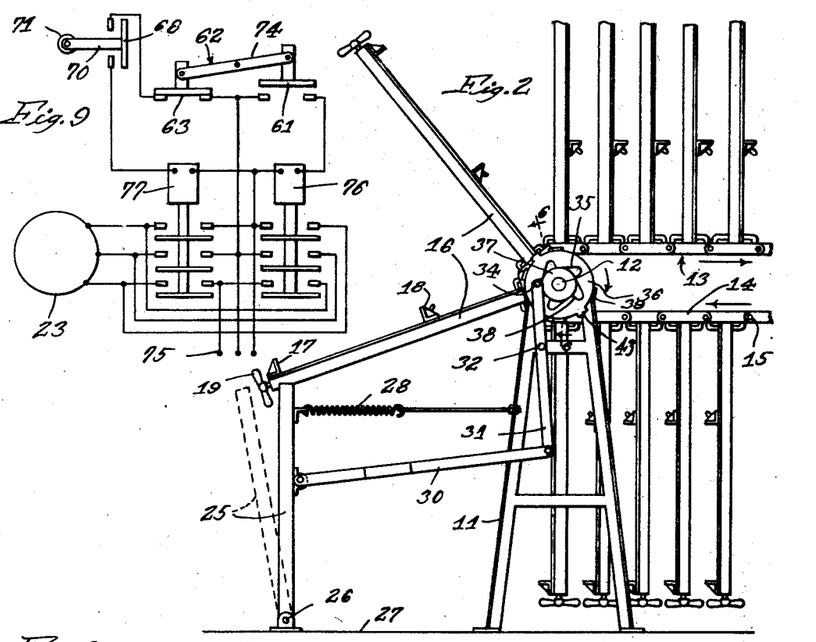
Fig. 2 is a similar view from the opposite side of the machine.
Fig. 9 is an electric wiring diagram.

The numerals 10 and 11 designate a pair of standards at the front end of the machine supporting a cross-shaft 12 carrying sprockets over which the endless carrier 13, made up of links 14 pivotally connected by cross-rods 15, extends for support and intermittent drive. The cross-rods 15 slidably support the clamping devices 16 thereon for adjustment laterally of the machine. Each of these clamps is preferably of the screw type disclosed in the Edwin J. Billstrom Patent 1,670,297, issued May 22, 1928, in which a stationary jaw 17 cooperates with a movable jaw 18 on the body of the clamp to clamp glued work therebetween, the movable jaw being operated by means of a screw (not shown) having a nut threaded thereon forming the hub part of the rotary handle 19. The endless carrier 13 is driven by a worm gear fixed on the shaft 12 in the housing 20 meshing with a worm in the housing 21. The worm is on a shaft 22 driven by the reversible electric motor 23 through the chain and sprocket connection indicated at 24. In wide machines, motor driven worm gears are provided on both ends of the shaft 12, to reduce torque deflection in the shaft. The motor 23 is shown mounted on the outer side of the standard 10, as shown, while the housings 20 and 21 are carried on the upper end of the standard. At 25 is indicated an upright support pivotally mounted, as at 26, relative to the floor 27 in front of the machine and normally held in an upright position by means of a coiled tension spring 28 at each end of the support, the springs being attached at one end to the standards 10 and 11 and at the other end to the support, as shown. The support is adapted to be swung outwardly to the dotted line position shown in Fig. 2, but the return movement is limited by the abutment 29 suitably secured to the floor behind the support. Although this abutment is shown as provided only on the left side of the machine where the automatic control mechanism hereinafter described is provided, it should be clear that such abutments may be provided on both sides of the machine. In wide machines employing two drive motors, the two motors will be connected with the one control mechanism to start and stop in unison. The support 25, as shown in Fig. 2, is swingable by means of a link connection 30 with the lower end of a lever 31 pivoted near its upper end, as at 32, on the standard 11 and carrying a roller 33 on a stud 34 on the upper end. The roller rides on the profiled cam track 35 on the inner periphery of the cam ring 36 which turns with a disk 37 keyed on the cross-shaft 12. In that way the support 25 is arranged to be swung outwardly in proper timed relation to the movement of the endless carrier 13, so that the support will not interfere with the movement of the clamps 16 past the same, the support being in the dotted line position until a given set of clamps has been moved past the upper end of the support, whereupon the roller 33 rides into a depression 38 in the profiled inner periphery 35 of the cam ring 36 and the support is swung inwardly under action of the springs 28 to the normal upright position to rest the clamps thereon. It is apparent that where it is desired to have the clamps 16 in an inclined position for loading and unloading, it is necessary to have the clamps move upwardly past the operative position to allow the support 25 to move into place therebeneath before the clamps are lowered onto the support by reverse movement of the endless carrier 13. This reverse travel necessitates rotatably mounting the cam ring 36 on the disk 37 by means of L-shaped plates 39 so that when the roller 33 is engaged in one of the depressions 38, thus preventing reverse rotation of the cam ring 36, the disk 37 will be free to turn in the reverse direction through a small angularity. A coiled tension spring 40 has one end connected to the disk 37, as at 41, and the other end connected to the ring 36 through the medium of one of the plates 39, as at 42, and tends to keep the ring 36 in a predetermined position of angularity with respect to the disk 37 with two diametrically opposed plates 39 in engagement with lugs 43 provided on the periphery of the disk. These lugs serve by engagement with the plates 39 to provide a positive driving connection between the disk 37 and the ring 36 to turn the ring positively in a forward direction in the advancement of the endless carrier 13. Now, it will be evident that with the old arrangement, where the operator controlled the operation of the motor 23 directly by depressing push buttons to start, stop, and reverse the motor, the operation required close attention on the part of the operator and also required good timing so that the endless carrier 13 would not be apt to overrun too far in the forward direction or too far in the reverse direction. It is also evident that aside from the skill and careful attention required on the part of the operator, the old control means was unsatisfactory from the standpoint of the wasting of time involved, not to mention the danger of damage to the machine in the event the operator was unskilled or became careless. The "automatic hand" provided in accordance with our invention eliminates these objections.

Figure 3:
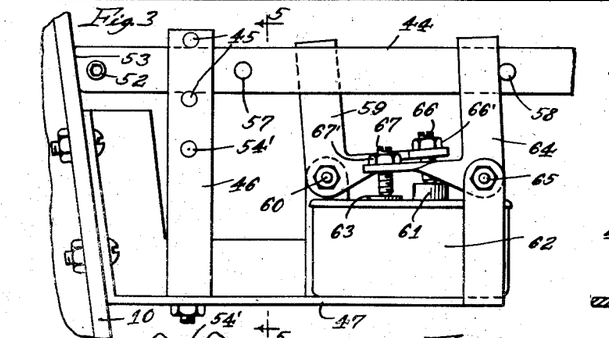
Fig. 3 is an enlargement of a portion of Fig. 1 illustrating the reversing switch and the manually operable trip rod therefor.
Figure 4:
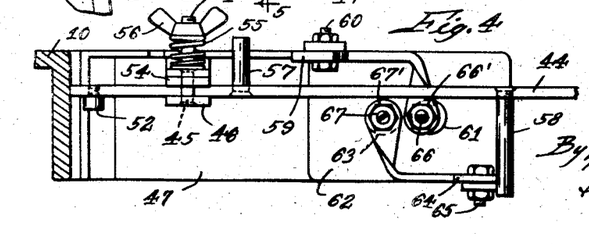
Fig. 4 is a plan view of Fig. 3.
Figure 5:
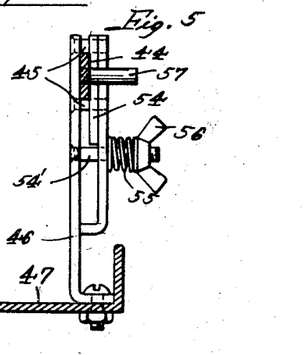
Fig. 5 is a sectional detail on the line 5—5 of Fig. 3.
Figure 6:
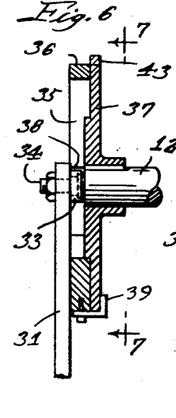
Fig. 6 is a sectional detail on the line 6—6 of Fig. 2.
Figure 8:
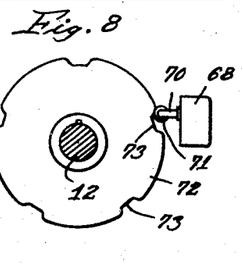
Fig. 8 is a side view of the circuit breaking cam appearing in dotted lines in Fig. 1.

In accordance with our invention a control rod 44 is provided slidably mounted at the rear end between vertically spaced pins 45 on a support 46 mounted on a bracket 47 secured to the standard 10, while the front or handle end 48 projects through a slot 49 in an L-shaped guide plate 50 mounted on the side of the support 25. A notch 51 is provided in the rod next to the handle end portion to lock the rod releasably against accidental outward movement until such time as the operator wants to index the machine, whereupon he will raise the handle end 48 and then pull the rod 44 outwardly, sliding it in the slot 49, to start the indexing operation as will soon appear. A stop projection 52 on the rear end of the rod serves by engagement with the back of the support 46 to limit the manual withdrawal of the rod. Return movement of the rod is limited by engagement with the standard 10, as indicated at 53. A friction plate 54 mounted on the pin 54' and pressed against the rod 44 under the action of the spring 55 offers sufficient frictional drag on the movement of the rod 44 so that it will not be apt to move in either direction accidentally. The wing nut 56 can be tightened or loosened on the pin 54' to provide the desired frictional drag and compensate for what little wear is apt to occur between the parts. Now, there are two pins 57 and 58 projecting laterally from opposite sides of the rod 44 in longitudinally spaced relation on said rod. The pin 57 is arranged to operate a bell crank lever 59 pivotally mounted on the bracket 47 at 60 to depress the starting button 61 of the switch 62 suitably secured on the bracket 47. This switch is of a well known two-button type, in which when one button is depressed the other button projects, and vice versa. Thus in Fig. 3 the button 61 is shown projecting while the other button 63 is depressed. Depression of the button 61 is accompanied by projection of the button 63, and vice versa. Another bell crank lever 64 pivoted on the bracket 47, as at 65, cooperates with the pin 58 to depress the button 63 in the return movement of the rod 44. Screws 66 and 67 are provided on the levers 59 and 64, respectively, to permit such adjustment as may be found necessary in the operating connections between the levers and push buttons. The lock nuts 66' and 67' serve when tightened to secure the screws in adjusted positions. The button 61 is the "forward" button and the button 63 is the "reverse" button. There is another switch 68 (see Figs. 1 and 8) associated with the switch 62 and more particularly the circuit controlled by the reverse button 63. This switch is carried on an arm 69 projecting upwardly from the standard 10 and has a spring pressed plunger 70 which is normally urged outwardly so that the roller 71 on the outer end thereof rides on the periphery of the cam 72 keyed on the cross-shaft 12. The cam has depression 73 in circumferentially spaced relation around the periphery thereof into which the plunger 70 rides at the end portion of each indexing movement of the endless carrier 13 when a set of clamps 16 is in position over the support 25. It is only when the plunger 70 is projecting into one of these depressions that the switch is closed so as to complete the circuit with switch 62 through the motor 23 for its reverse operation. Then in the small reverse movement of the endless carrier 13, sufficient to bring the clamps 16 down into engagement on top of the support 25, the cam 72 causes the plunger 70 to be returned as the roller 71 rides part way out of the depression 73, as illustrated in Fig. 8, and in that way the circuit through the motor 23 is broken and the return movement of the endless carrier is accordingly stopped.

Fig. 9 is a wiring diagram and shows how the motor 23 is electrically connected with the switches 62 and 68. The tester bar 74 illustrates diagrammatically the interconnection of the forward and reverse buttons 61 and 63 so that when one of these buttons is depressed the other is automatically raised. At 75 is indicated the line terminals, and at 76 and 77 are indicated the conventional solenoids or starting coils, the energization of which is controlled by the forward and reverse buttons 61 and 63, respectively. The box indicated at 78 in Fig. 1 houses the switch mechanism, including the solenoids 76 and 77. The circuit is illustrated with the parts in their respective positions at the end of an indexing movement.

Figure 7:
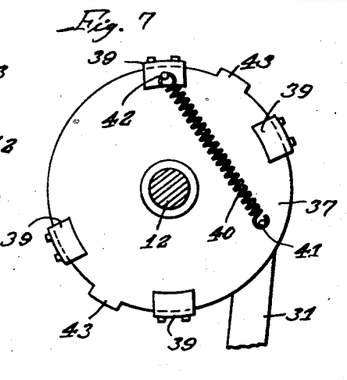
Fig. 7 is a section on the line 7—7 of Fig. 6.

In operation, the operator to start an indexing movement grasps the handle end 48 of the rod 44 and lifts the rod enough to disconnect the notched portion 51 from the guide 50, whereupon the rod 44 is pulled outwardly until the stud 52 strikes the support 46, in which movement the pin 57 strikes and moves the lever 59 so as to depress the forward button 61. This energizes the coil 76 and causes the motor 23 to commence running in the forward direction. The depression of the button 61 is, of course, accompanied automatically with the raising of the button 63, the pin 58 being moved with the rod 44 away from the lever 64 to allow the button 63 to rise. In the forward turning of the motor 23, the shaft 12 is turned in a counterclockwise direction as viewed in Fig. 1 or a clockwise direction as viewed in Fig. 2. The endless carrier 13 is accordingly moved in the direction indicated by the arrows in Figs. 1 and 2 to bring the next set of clamps 16 from the dependent position below the carrier to a position projecting forwardly from the carrier over the support 25. Before this next set of clamps reaches the support 25, the latter is positively swung outwardly by means of the cam ring 36 working on the roller 33 on the lever 31 to oscillate the latter. The timing is such that the support 25 is swung outwardly out of the way of the advancing clamps 16 and after the clamps are advanced far enough so that there is nothing to interfere with the return of the support 25 to its normal position, the next depression 38 in the cam ring 36 allows the lever 31 to return to its previous position as the roller 33 rides into the depression 38, the springs 28 causing the lever 31 to be urged in that direction while at the same time returning the support 25 to the normal upright position. Now, in the outward movement of the support 25, the guide 50 on the support slides outwardly on the rod 44 past the notch 51, and in the return movement of the support 25, the guide 50 rides into the notch 51 and accordingly positively returns the rod 44 to its previous position in abutment with the standard 10. At the end of this return movement of the rod 44, the pin 58 strikes and moves the lever 64, thus depressing the reverse button 63 and at the same time raising the forward button 61. Bearing in mind the fact that at this particular point the roller 71 on the plunger 70 associated with the auxiliary switch 68 has also dropped into a depression 73 on the cam 72, it is clear that the reverse circuit through the motor 23 is then completed and the motor 23 commences turning in the opposite direction so as to turn the shaft 12 in a clockwise direction as viewed in Fig. 1 and counterclockwise direction as viewed in Fig. 2. This movement is through a small angularity, only enough to bring the set of clamps 16 from a position just above the support 25 down into engagement with the support. In this reverse turning of the shaft 12, the cam 72 is turned in a clockwise direction as viewed in Figs. 1 and 8 and the plunger 70, as most clearly shown in Fig. 8, is moved to open circuit position as the roller 71 rides part way out of the depression 73, thus stopping the motor 23. The slight reverse turning of the shaft 12 is permitted by the yielding connection between the disk 37 and cam ring 36 illustrated in Figs. 6 and 7. The disk 37, however, has a positive driving connection with the cam ring 36 for the forward movement, this connection being afforded by the lugs 43, which, except after reverse turning of the shaft 12 illustrated in Fig. 7, are in positive engagement with one diametrically opposed pair of plates 39 on the cam ring 36.

It is apparent from the foregoing that the "automatic hand" provided in accordance with our invention simplifies the operation of the machine considerably and also saves time. It also enables the operation of the machine by a more or less unskilled operator without danger of damage to the machine. While we have described the invention as applied specifically to a glue clamp carrier, it should, of course, be apparent that with slight modification or adaptation the invention is applicable to various other machines of the intermittently advanced type, wherever a similar problem in the control of the indexing operation of the machine is presented.

Figure 10:
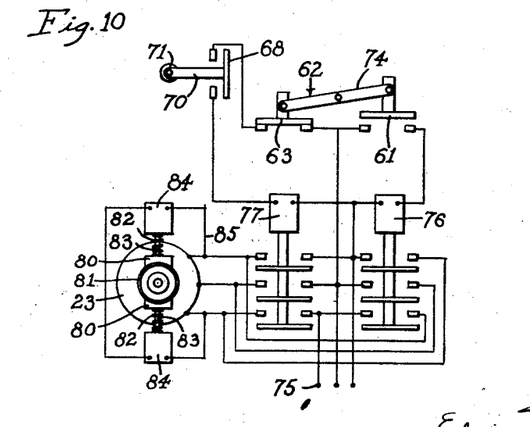
Fig. 10 is another electric wiring diagram including electromagnetic brake means for the drive motor.

Fig. 10 shows another wiring diagram, similar to Fig. 9, in which brake shoes 80 are illustrated held in contact with a brake drum 81 turning with the armature of the motor 23, coiled compression springs 82 being provided for normally urging the shoes into contact with the drum. The springs 82 surround plungers 83 reciprocable in solenoid coils 84 electrically connected in series with the motor 23, as indicated at 85. Thus whenever the circuit through the motor 23 is completed, the brake shoes 80 are retracted electromagnetically against the action of the springs 82, but the instant that the circuit is broken the springs 82 cause engagement of the shoes 80 to minimize overrun of the motor. Bearing in mind the fact that the motor 23, as shown in Fig. 1, has a more or less direct driving connection with the shaft 12 through the chain and sprocket connection indicated at 24, it will be evident that at the end of the indexing movement described above, when the auxiliary reversing switch 68 is operated to open circuit position by reason of the roller 71 riding part way out of the depression 73, there will be no danger of the motor 23 overrunning enough to cause jamming of the clamps 16 on the support 25. The clamps can accordingly be adjusted with comparative ease on the cross-rods 15 laterally with respect to the support 25. The addition of the brake drum 81 and automatic brake mechanism, it should be evident, does not involve much additional expense and greatly improves the performance of the machine as a whole.

Figure 11:
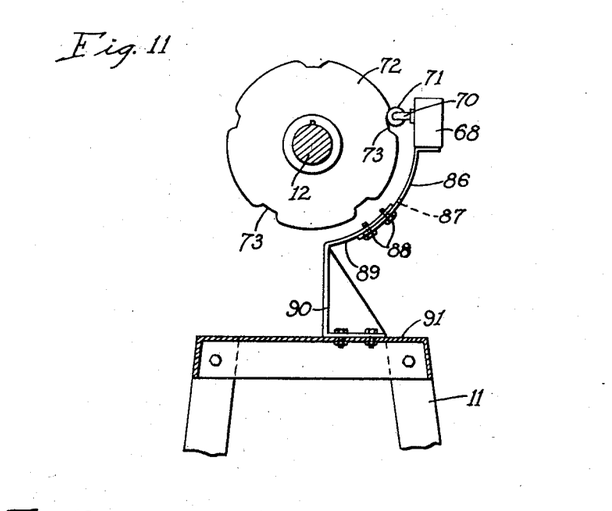
Fig. 11 is a fragmentary sectional detail similar to Fig. 8 but showing an adjustable mounting for the auxiliary reverse switch.

As an alternative or as an additional provision to prevent jamming of the clamps 16 on the support 25 in the reverse operation of the machine at the end of the indexing movement, we may mount the auxiliary reversing switch 68 on an adjustable bracket 86, as shown in Fig. 11. This bracket 86 is of arcuate form, struck on a radius with the axis of the shaft 12 as a circle, and is disposed in concentric relation with the periphery of the cam 72, as shown. An elongated slot 87 is provided in the bracket 86 through which bolts 88 are entered to mount the adjustable bracket 86 on the arcuate upper end portion 89 of a bracket 90, which, in turn, is carried on a support 91 on the standards 10 and 11. Adjustment of the switch 68 with the bracket 86 clockwise or counterclockwise relative to the cam 72 will retard or advance the breaking of the motor circuit in the small reversing turning of the shaft 12, and in that way due allowance can be made for overrun of the motor 23 to prevent jamming of the clamps 16 on the support 25. Of course, the provision of the brake drum 81 and automatic brake mechanism previously described, in addition to the adjustable bracket 86, simplifies matters considerably because of the extent to which overrun of the motor is reduced, thus permitting closer adjustment and insuring all around better performance.

We claim:

1. In a machine of the class described, comprising an endless carrier, a drive shaft therefor adapted to be driven in either direction for forward or reverse travel of the carrier, a reversible electric motor connected to drive said shaft, clamps supported by the carrier, a support pivotally mounted in spaced relation to the carrier for oscillating movement to and from a position where one set of clamps in a nearly horizontal position at one end of the machine is adapted to rest thereon, and means operable in timed relation with the turning of the drive shaft to swing the support outwardly and return it in timed relation with the movement of the clamps, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, manually operable means for closing the forward switch to start an indexing movement of the carrier, means operable by the support in its return movement to close the reverse switch, and another means operated in timed relation with the turning of said drive shaft to close the auxiliary switch at a predetermined point in the forward travel of the clamps with the carrier, said means being arranged to open said auxiliary reverse switch again when the set of clamps over the support is brought to rest thereon.

2. In a machine of the class described, comprising an endless carrier, a drive shaft therefor adapted to be driven in either direction for forward or reverse travel of the carrier, a reversible electric motor connected to drive said shaft, clamps supported by the carrier, a support pivotally mounted in spaced relation to the carrier for oscillating movement to and from a position where one set of clamps in a nearly horizontal position at one end of the machine is adapted to rest thereon, and means operable in timed relation with the turning of the drive shaft to swing the support outwardly and return it in timed relation with the movement of the clamps, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, manually operable means for closing the forward switch to start an indexing movement of the carrier, means operated in timed relation with the turning of the drive shaft for closing the reverse switch when a set of clamps has been advanced to a predetermined position over the support, and another means operated in timed relation with the turning of said drive shaft to close the auxiliary reverse switch at a predetermined point in the forward travel of the clamps with the carrier, said means being arranged to open said auxiliary reverse switch again when the set of clamps over the support is brought to rest thereon.

3. In a machine of the class described, comprising an endless carrier, a drive shaft therefor adapted to be driven in either direction for forward or reverse travel of the carrier, a reversible electric motor connected to drive said shaft, clamps supported by the carrier, a support pivotally mounted in spaced relation to the carrier for oscillating movement to and from a position where one set of clamps in a nearly horizontal position at one end of the machine is adapted to rest thereon, and means operable in timed relation with the turning of the drive shaft to swing the support outwardly and return it in timed relation with the movement of the clamps, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, a push and pull rod operatively associated with said forward and reverse switches arranged to be moved in one direction manually to close the forward switch and arranged to be moved automatically in the opposite direction by said support in its return movement to close the reverse switch, and means operated in timed relation with the turning of said drive shaft to close the auxiliary reverse switch at a predetermined point in the forward travel of the clamps with the carrier, said means being arranged to open said auxiliary reverse switch again when the set of clamps over the support is brought to rest thereon.

4. A machine as set forth in claim 3, including a guide on said clamp support wherein said push and pull rod is slidable, said rod having a notch provided therein to receive therein a portion of said guide to connect the support to the rod to move the latter with the support in the return movement of said support.

5. A machine as set forth in claim 3, including stops for limiting the push and pull movement of said rod, and manually adjustable friction means for yieldingly holding said rod in either of its extreme positions.

6. A machine as set forth in claim 1, wherein the means operable in timed relation with the turning of the drive shaft to swing the support outwardly and return it in timed relationship with the movement of the clamps includes a member turning with said drive shaft, a cam rotatably mounted with respect to said drive shaft, and means for positively turning said cam with said member in the forward direction.

7. A machine as set forth in claim 1, wherein the means operable in timed relation with the turning of the drive shaft to swing the support outwardly and return it in timed relationship with the movement of the clamps includes a member turning with said drive shaft, a cam rotatably mounted with respect to said drive shaft, means for positively turning said cam with said member in the forward direction, and spring means interconnecting said cam and member to resist turning of the member relative to the cam in the opposite direction.

8. Automatic control mechanism for controlling the forward and reverse movements of a motor operated device, comprising in combination with a reversible electric motor for driving said device in either direction, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, manually operable means for closing the forward switch to start a forward movement of said device, means operable at a predetermined point in the movement of said device to close the reverse switch, and another means operated in timed relation with said device to close the auxiliary reverse switch at a predetermined point in the forward movement of said device, said means being arranged to open said auxiliary reverse switch again at a predetermined point in the reverse movement of said device.

9. Automatic control mechanism for controlling the forward and reverse movements of a motor operated device, comprising in combination with a reversible electric motor for driving said device in either direction, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, a push and pull rod operatively associated with said forward and reverse switches arranged to be moved in one direction manually to close the forward switch and arranged to be moved automatically in the opposite direction by said device at a predetermined point in its forward movement to close the reverse switch, and another means operated in timed relation with said device to close the auxiliary reverse switch at a predetermined point in the forward movement of said device, said means being arranged to open said auxiliary reverse switch again at a predetermined point in the reverse movement of said device.

10. A control mechanism as set forth in claim 9, including stops for limiting the push and pull movement of said rod, and manually adjustable friction means for yieldingly holding said rod in either of its extreme positions.

11. In a machine of the class described, comprising an endless carrier, a drive shaft therefor adapted to be driven in either direction for forward or reverse travel of the carrier, a reversible electric motor connected to drive said shaft, members mounted on said carrier in spaced substantially parallel relation, a support pivotally mounted in spaced relation to the carrier for oscillating movement to and from a position where one set of said carrier members in a nearly horizontal position at one end of the machine is adapted to rest thereon, and means operable in timed relation with the turning of the drive shaft to swing the support outwardly and return it in timed relation with the movement of the carrier member, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, manually operable means for closing the forward switch to start an indexing movement of the carrier, means operable by the support in its return movement to close the reverse switch, and another means operated in timed relation with the turning of said drive shaft to close the auxiliary switch at a predetermined point in the forward travel of the carrier members with the carrier, said means being arranged to open said auxiliary reverse switch again when the set of carrier members over the support is brought to rest thereon.

12. In a machine of the class described, comprising an endless carrier, a drive shaft therefor adapted to be driven in either direction for forward or reverse travel of the carrier, a reversible electric motor connected to drive said shaft, members mounted on said carrier in spaced substantially parallel relation, a support pivotally mounted in spaced relation to the carrier for oscillating movement to and from a position where one set of said carrier members in a nearly horizontal position at one end of the machine is adapted to rest thereon, and means operable in timed relation with the turning of the drive shaft to swing the support outwardly and return it in timed relation with the movement of the carrier members, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, manually operable means for closing the forward switch to start an indexing movement of the carrier, means operated in timed relation with the turning of the drive shaft for closing the reverse switch when a set of carrier members has been advanced to a predetermined position over the support, and another means operated in timed relation with the turning of said drive shaft to close the auxiliary reverse switch at a predetermined point in the forward travel of the carrier members with the carrier, said means being arranged to open said auxiliary reverse switch again when the set of carrier members over the support is brought to rest thereon.

13. In a machine of the class described, comprising an endless carrier, a drive shaft therefor adapted to be driven in either direction for forward or reverse travel of the carrier, a reversible electric motor connected to drive said shaft, members mounted on said carrier in spaced substantially parallel relation, a support pivotally mounted in spaced relation to the carrier for oscillating movement to and from a position where one set of said carrier members in a nearly horizontal position at one end of the machine is adapted to rest thereon, and means operable in timed relation with the turning of the drive shaft to swing the support outwardly and return it in timed relation with the movement of the carrier members, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, a push and pull rod operatively associated with said forward and reverse switches arranged to be moved in one direction manually to close the forward switch and arranged to be moved automatically in the opposite direction by said support in its return movement to close the reverse switch, and means operated in timed relation with the turning of said drive shaft to close the auxiliary reverse switch at a predetermined point in the forward travel of the carrier members with the carrier, said means being arranged to open said auxiliary reverse switch again when the set of carrier members over the support is brought to rest thereon.

14. A machine as set forth in claim 13, including a guide on said clamp support wherein said push and pull rod is slidable, said rod having a notch provided therein to receive therein a portion of said guide to connect the support to the rod to move the latter with the support in the return movement of said support.

15. A machine as set forth in claim 13, including stops for limiting the push and pull movement of said rod, and manually adjustable friction means for yieldingly holding said rod in either of its extreme positions.

16. A machine as set forth in claim 11, wherein the means operable in timed relation with the turning of the drive shaft to swing the support outwardly and return it in timed relationship with the movement of the carrier members includes a member turning with said drive shaft, a cam rotatably mounted with respect to said drive shaft, and means for positively turning said cam with said member in the forward direction.

17. A machine as set forth in claim 11, wherein the means operable in timed relation with the turning of the drive shaft to swing the support outwardly and return it in timed relationship with the movement of the carrier members includes a member turning with said drive shaft, a cam rotatably mounted with respect to said drive shaft, means for positively turning said cam with said member in the forward direction, and spring means interconnecting said cam and member to resist turning of the member relative to the cam in the opposite direction.

18. Automatic control mechanism for controlling the forward and reverse movements of a motor operated device, comprising in combination with a reversible electric motor for driving said device in either direction, a motor reversing electrical switch mechanism between a source of electric current supply and said motor to control the operation of the latter, manually operable means for moving said switch mechanism from neutral to one position to start a forward movement of said device, means operable at a predetermined point in the movement of said device to move said switch mechanism to another position to reverse the movement of said device, and another means operated in timed relation with said device to move said switch mechanism to neutral again at a predetermined point in the reverse movement of said device.

19. Automatic control mechanism for controlling the forward and reverse movement of a motor operated device, comprising in combination with a reversible electric motor for driving said device in either direction, a motor reversing electrical switch mechanism between a source of electric current supply and said motor to control the operation of the latter, a push and pull rod operatively associated with said switch mechanism arranged to be moved in one direction manually to move said switch mechanism from neutral to one position to cause forward movement of said device and arranged to be moved automatically in the opposite direction by said device at a predetermined point in its forward movement to move said switch mechanism to a second position to reverse the movement of said device, and another means operated in timed relation with said device to move said switch mechanism to neutral again at a predetermined point in the reverse movement of said device.

20. A control mechanism as set forth in claim 19, including stops for limiting the push and pull movement of said rod, and manually adjustable friction means for yieldingly holding said rod in either of its extreme positions.

21. In a machine of the class described, comprising an endless carrier, a drive shaft therefor adapted to be driven in either direction for forward or reverse travel of the carrier, a reversible electic motor connected to drive said shaft, members mounted on said carrier in spaced substantially parallel relation, a support pivotally mounted in spaced relation to the carrier for oscillating movement to and from a position where one set of said carrier members in a nearly horizontal position at one end of the machine is adapted to rest thereon, and means operable in timed relation with the turning of the drive shaft to swing the support outwardly and return it in timed relation with the movement of the carrier members, a motor reversing electrical switch mechanism between a source of electric current supply and said motor to control the operation of the latter, manually operable means for moving said switch mechanism from neutral to a position to start an indexing movement of the carrier, means operable by the support in its return movement to move said switch mechanism to another position to reverse the carrier, and another means operated in timed relation with the turning of said drive shaft to move said switch mechanism to neutral again when the set of carrier members over the support is brought to rest thereon.

22. In a machine of the class described, comprising an endless carrier, a drive shaft therefor adapted to be driven in either direction forward or reverse travel of the carrier, a reversible electric motor connected to drive said shaft, members mounted on said carrier in spaced substantially parallel relation, a support pivotally mounted in spaced relation to the carrier for oscillating movement to and from a position where one set of said carrier members in a nearly horizontal position at one end of the machine is adapted to rest thereon, and means operable in timed relation with the turning of the drive shaft to swing the support outwardly and return it in timed relation with the movement of the carrier members, a motor reversing electrical switch mechanism between a source of electric current supply and said motor to control the operation of the latter, manually operable means for moving said switch mechanism from neutral to a position to start an indexing movement of the carrier, means operated in timed relation with the turning of the drive shaft for moving said switch mechanism to another position to reverse the carrier when a set of carrier members has been advanced to a predetermined position over the support, and another means operated in timed relation with the turning of said drive shaft to move said switch mechanism to neutral again when the set of carrier members over the support is brought to rest thereon.

23. In a machine of the class described, comprising an endless carrier, a drive shaft therefor adapted to be driven in either direction for forward or reverse travel of the carrier, a reversible electric motor connected to drive said shaft, members mounted on said carrier in spaced substantially parallel relation, a support pivotally mounted in spaced relation to the carrier for oscillating movement to and from a position where one set of said carrier members in a nearly horizontal position at one end of the machine is adapted to rest thereon, and means operable in timed relation with the turning of the drive shaft to swing the support outwardly and return it in timed relation with the movement of the carrier members, a motor reversing electrical switch mechanism between a source of electric current supply and said motor to control the operation of the latter, a push and pull rod operatively associated with said switch mechanism arranged to be moved in one direction manually to move said switch mechanism from neutral to a position to cause forward movement of the carrier and arranged to be moved automatically in the opposite direction by said support in its return movement to move said switch mechanism to a second position to reverse the movement of the carrier, and means operated in timed relation with the turning of said drive shaft to move said switch mechanism to neutral again when the set of carrier members over the support is brought to rest thereon.

24. A machine as set forth in claim 23, including a guide on said clamp support wherein said push and pull rod is slidable, said rod having a notch provided therein to receive therein a portion of said guide to connect the support to the rod to move the latter with the support in the return movement of said support.

25. A machine as set forth in claim 23, including stops for limiting the push and pull movement of said rod, and manually adjustable friction means for yieldingly holding said rod in either of its extreme positions.

26. A machine as set forth in claim 21, wherein the means operable in timed relation with the turning of the drive shaft to swing the support outwardly and return it in timed relationship with the movement of the carrier members includes a member turning with said drive shaft, a cam rotatably mounted with respect to said drive shaft, and means for positively turning said cam with said member in the forward direction.

27. A machine as set forth in claim 21, wherein the means operable in timed relation with the turning of the drive shaft to swing the support outwardly and return it in timed relationship with the movement of the carrier members includes a member turning with said drive shaft, a cam rotatably mounted with respect to said drive shaft, means for positively turning said cam with said member in the forward direction, and spring means interconnecting said cam and member to resist turning of the member relative to the cam in the opposite direction.

28. Automatic control mechanism for controlling the forward and reverse movements of a motor operated device, comprising in combination with a reversible electric motor for driving said device in either direction, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, manually operable means for closing the forward switch to start a forward movement of said device, means operable at a predetermined point in the movement of said device to close the reverse switch, another means operated in timed relation with said device to close the auxiliary reverse switch at a predetermined point in the forward movement of said device, said means being arranged to open said auxiliary reverse switch again at a predetermined point in the reverse movement of said device, and means providing an adjustment for said auxiliary reverse switch in relation to the last mentioned means to advance or retard the opening of said switch and accordingly shorten or lengthen the reverse movement of said device.

29. In a machine of the class described, comprising an endless carrier, a drive shaft therefor adapted to be driven in either direction for forward or reverse travel of the carrier, a reversible electric motor connected to drive said shaft, members mounted on said carrier in spaced substantially parallel relation, a support pivotally mounted in spaced relation to the carrier for oscillating movement to and from a position where one set of said carrier members in a nearly horizontal position at one end of the machine is adapted to rest thereon, and means operable in timed relation with the turning of the drive shaft to swing the support outwardly and return it in timed relation with the movement of the carrier members, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, manually operable means for closing the forward switch to start an indexing movement of the carrier, means operated in timed relation with the turning of the drive shaft for closing the reverse switch when a set of carrier members has been advanced to a predetermined position over the support, another means operated in timed relation with the turning of said drive shaft to close the auxiliary reverse switch at a predetermined point in the forward travel of the carrier members with the carrier, said means being arranged to open said auxiliary reverse switch again when the set of carrier members over the support is brought to rest thereon, and means providing an adjustment for said auxiliary reverse switch in relation to the last mentioned means to advance or retard the opening of said switch relative to the engagement of the carrier members with the support.

30. Automatic control mechanism for controlling the forward and reverse movements of a motor operated device, comprising in combination with a reversible electric motor for driving said device in either direction, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary rverse switch, manually operable means for closing the forward switch to start a forward movement of said device, means operable at a predetermined point in the movement of said device to close the reverse switch, another means operated in timed relation with said device to close the auxiliary reverse switch at a predetermined point in the forward movement of said device, said means being arranged to open said auxiliary reverse switch again at a predetermined point in the reverse movement of said device, brake means for stopping the overrun of the motor when the electrical circuit therefor is interrupted, and electromagnetic means for automatically releasing the brake means connected in the electrical circuit with the motor whenever the motor circuit is closed.

31. In a machine of the class described, comprising an endless carrier, a drive shaft therefor adapted to be driven in either direction for forward or reverse travel of the carrier, a reversible electric motor connected to drive said shaft, members mounted on said carrier in spaced substantially parallel relation, a support pivotally mounted in spaced relation to the carrier for oscillating movement to and from a position where one set of said carrier members in a nearly horizontal position at one end of the machine is adapted to rest thereon, and means operable in timed relation with the turning of the drive shaft to swing the support outwardly and return it in timed relation with the movement of the carrier members, electrical switch means between a source of electric current supply and said motor to control the operation of the latter, including a forward switch, a reverse switch, and an auxiliary reverse switch, means mechanically connecting the forward and reverse switches whereby when one is closed the other is opened, the reverse switch being connected electrically in series with the auxiliary reverse switch, manually operable means for closing the forward switch to start an indexing movement of the carrier, means operated in timed relation with the turning of the drive shaft for closing the reverse switch when a set of carrier members has been advanced to a predetermined position over the support, another means operated in timed relation with the turning of said drive shaft to close the auxiliary reverse switch at a predetermined point in the forward travel of the carrier members with the carrier, said means being arranged to open said auxiliary reverse switch again when the set of carrier members over the support is brought to rest thereon, brake means for stopping the overrun of the motor when the electrical circuit therefor is interrupted, and electromagnetic means for automatically releasing the brake means connected in the electrical circuit with the motor wheneved the motor circuit is closed.

32. Automatic control mechanism for controlling the forward and reverse movements of a motor operated device, comprising in combination with a reversible electric motor for driving said device in either direction, a motor reversing electrical switch mechanism between a source of electric current supply and said motor to control the operation of the latter, manually operable means for moving said switch mechanism from neutral to one position to start a forward movement of said device, means operable at a predetermined point in the movement of said device to move said switch mechanism to another position to reverse the movement of said device, another means operated in timed relation with said device to move said switch mechanism to neutral again at a predetermined point in the reverse movement of said device, and means providing an adjustment for said switch mechanism in relation to the last mentioned means to advance or retard the opening of the motor circuit and accordingly shorten or lengthen the reverse movement of said device.

33. Automatic control mechanism for controlling the forward and reverse movements of a motor operated device, comprising in combination with a reversible electric motor for driving said device in either direction, a motor reversing electrical switch mechanism between a source of electric current supply and said motor to control the operation of the latter, manually operable means for moving said switch mechanism from neutral to one position to start a forward movement of said device, means operable at a predetermined point in the movement of said device to move said switch mechanism to another position to reverse the movement of said device, another means operated in timed relation with said device to move said switch mechanism to neutral again at a predetermined point in the reverse movement of said device, brake means for stopping the overrun of the motor when the electrical circuit therefor is interrupted, and electromagnetic means for automatically releasing the brake means connected in the electrical circuit with the motor whenever the motor circuit is closed.

EDWIN J. BILLSTROM.
ANDREW W. REDIN.